United States Patent
Himmelbauer et al.

(10) Patent No.: US 11,313,446 B2
(45) Date of Patent: Apr. 26, 2022

(54) DRIVE DEVICE

(71) Applicant: MAGNA Powertrain GmbH & Co KG, Lannach (AT)

(72) Inventors: Thomas Himmelbauer, Ernsthofen (AT); Martin Koenigsecker, Hargelsberg (AT); Johannes Kriener, Pabneukirchen (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 0 days.

(21) Appl. No.: 16/633,305

(22) PCT Filed: Jun. 22, 2018

(86) PCT No.: PCT/EP2018/066701
§ 371 (c)(1),
(2) Date: Jan. 23, 2020

(87) PCT Pub. No.: WO2019/025076
PCT Pub. Date: Feb. 7, 2019

(65) Prior Publication Data
US 2020/0158218 A1    May 21, 2020

(30) Foreign Application Priority Data
Jul. 31, 2017   (DE) ................... 102017213110.1

(51) Int. Cl.
*F16H 37/08*    (2006.01)
*B60K 1/02*     (2006.01)
*B60K 17/08*    (2006.01)
*B60K 17/16*    (2006.01)
*B60K 23/04*    (2006.01)
(Continued)

(52) U.S. Cl.
CPC ........... *F16H 37/0813* (2013.01); *B60K 1/02* (2013.01); *B60K 17/08* (2013.01); *B60K 17/165* (2013.01); *B60K 23/04* (2013.01); *F16H 48/08* (2013.01); *F16H 48/20* (2013.01); *F16H 48/36* (2013.01); *F16H 63/3416* (2013.01); *B60K 2001/001* (2013.01); *B60K 2023/043* (2013.01); *B60K 2023/046* (2013.01); *F16H 2048/364* (2013.01);
(Continued)

(58) Field of Classification Search
CPC ............................... F16H 48/08; F16H 37/082
See application file for complete search history.

(56) References Cited

U.S. PATENT DOCUMENTS 8,876,643 B2 * 11/2014 Fickel ................ F16H 3/54
475/5

FOREIGN PATENT DOCUMENTS

DE   102007023462 A1   11/2008
DE   102010004228 A1   7/2011
(Continued)

OTHER PUBLICATIONS

International Search Report and Written Opinion dated Nov. 26, 2018 from International Patent Application No. PCT/EP2018/066701 (with English Translation of International Search Report).

*Primary Examiner* — Derek D Knight
(74) *Attorney, Agent, or Firm* — Dickinson Wright PLLC (57) ABSTRACT

A drive device for a motor vehicle, comprising a drive shaft, an at least two-speed manual transmission, a differential and a left and right output shaft, wherein the manual transmission is formed by a planetary gear mechanism, wherein the differential is integrated in the planetary gear mechanism.

18 Claims, 9 Drawing Sheets

(51) Int. Cl.
*F16H 48/08* (2006.01)
*F16H 48/20* (2012.01)
*F16H 48/36* (2012.01)
*F16H 63/34* (2006.01)
*B60K 1/00* (2006.01)

(52) U.S. Cl.
CPC ............... *F16H 2200/0017* (2013.01); *F16H 2200/0034* (2013.01); *F16H 2200/2005* (2013.01)

(56) References Cited

FOREIGN PATENT DOCUMENTS

| | | |
|---|---|---|
| DE | 102013016441 A1 | 4/2015 |
| DE | 102015217521 A1 | 3/2017 |
| WO | 2014033137 A1 | 3/2014 |

* cited by examiner

DRIVE DEVICE

CROSS-REFERENCE TO RELATED APPLICATIONS

This application is a National Stage of International Application No. PCT/EP2018/066701, filed Jun. 22, 2018, which claims priority to DE102017213110.1, filed Jul. 31, 2017. The entire disclosures of each of the above applications are incorporated herein by reference.

FIELD OF THE INVENTION

The present invention concerns a drive device for a motor vehicle, in particular for an electric vehicle.

BACKGROUND OF THE INVENTION

This section provides information related to the present disclosure which is not necessarily prior art Drive devices, which serve for driving a motor vehicle and thus ensuring its forward motion, have been known for a long time. It is also known that such drives may comprise a manual transmission for selection of various gear ratios for a drive motor rotational speed, and that a drive torque can be divided by means of a differential over two different output shafts, in particular for driving a left-hand wheel and a right-hand wheel of the motor vehicle.

In connection with electric motors as drive motors, very high requirements are imposed in relation to weight, installation size and efficiency of such drive devices.

SUMMARY OF THE INVENTION

This section provides a general summary of the disclosure, and is not a comprehensive disclosure of its full scope or all of its features It is an object of the invention to specify a drive device for a motor vehicle which is particularly lightweight and compact in construction, and hence allows efficient function.

The object is achieved by a drive device for a motor vehicle, comprising a drive shaft, an at least two-speed manual transmission, a differential and a left and right output shaft, wherein the manual transmission is formed by a planetary gear mechanism, and wherein the differential is integrated in the planetary gear mechanism.

According to the invention, a drive device is provided which allows the selection of at least two gears by means of a planetary gear mechanism. In this way for example, an electric motor as a drive motor may be operated closer to its optimal operating point. A maximal torque and maximal speed of the motor vehicle are thus easier to achieve via an e.g. electric drive motor. In addition, a differential is integrated directly into the manual transmission so that the differential can share the installation space required for the planetary gear mechanism. For this, preferably at least parts of the differential are arranged within the ring gear of the planetary gear mechanism. This reduces the installation space required for the drive device. The differential may therefore be configured together with the planetary gear mechanism on the drive shaft, and thereby be designed for lower torques, i.e. use smaller components. Overall, such a drive device therefore has low weight, requires little installation space, and has high efficiency.

The terms "left" and "right", such as for example in "left output shaft" and "right output shaft", according to the invention need not necessarily be understood in the longitudinal direction of the motor vehicle when the drive device is installed, and therefore lead to sides of a motor vehicle, but may for example also lead to a front and a rear axle.

Preferably, the planet carrier of the planetary gear mechanism forms the differential housing of the differential.

Differential gears of the differential are preferably mounted rotatably on the planet carrier of the planetary gear mechanism.

The planet carrier therefore fulfils a double function, and in addition to its function in the planetary gear mechanism and hence the manual transmission, also serves as a necessary part of the differential.

Preferably, the planetary gear mechanism is seated together with the differential on the drive shaft, so that the planetary gear mechanism together with the differential forms a common first transmission stage which may be configured as a compact package.

The drive shaft may drive the sun gear of the planetary gear mechanism.

The drive shaft may be formed directly by a rotor shaft of a drive motor or be rotationally connected to such a rotor shaft.

The output of the manual transmission preferably takes place via the planet carrier of the planetary gear mechanism.

Particularly preferably, the output of the manual transmission downstream of the planet carrier of the planetary gear mechanism takes place via differential gears and side gears of the differential, in particular to a left and a right output spur gear, wherein the output spur gears may also be configured as pinion shafts. In particular, the output spur gears may be formed on hollow shafts which at least in portions may be arranged coaxially to the drive shaft.

Preferably, the left output spur gear meshes with a left drive spur gear of the left output shaft, and the right output spur gear meshes with a right drive spur gear of the right output shaft, wherein the left and right output shaft and the left and right drive spur gear form a second gear stage of the drive device.

Preferably, the ring gear of the planetary gear mechanism can be moved selectively into a first position in which the ring gear is fixed to the housing, in particular for selecting a first gear of the manual transmission, and into a second position in which the ring gear is connected rotationally fixedly to the planet carrier so that it rotates therewith as one block, in particular for selecting a second gear of the manual transmission.

Particularly preferably, the ring gear of the planetary gear mechanism can be moved selectively into a third position in which the ring gear is connected neither fixedly to the housing nor to the planet carrier, so that a free rotational speed can be set at the ring gear, in particular for selecting a neutral gear of the manual transmission.

A differential lock may be formed between the left and right output shafts, so that the left and right output shafts can be coupled rotationally fixedly together by the differential lock, wherein the differential lock is in particular arranged between drive spur gears of the output shafts, i.e. in particular between the left and right drive spur gear. Such a differential lock may increase the traction of the motor vehicle in difficult driving situations, in that the function of the differential is disabled and the torque is distributed equally over the two outputs. Due to the position of the differential lock between the two output shafts, the free space between the drive spur gears of the output shafts may be used. It would also be relatively simple to retrofit such a differential lock.

A differential lock may also be arranged on the differential, so that the planet carrier and a differential gear of the differential can be coupled rotationally fixedly together by the differential lock, wherein the differential lock in particular is arranged axially next to the differential on the drive axis of the drive device. Because of the low torque, a differential lock in this position may be designed to be very compact and lightweight.

Preferably, a torque vectoring drive is arranged on the differential, wherein the torque vectoring drive can be coupled rotationally fixedly to the planet carrier and/or an output spur gear. The torque vectoring drive may in particular be arranged axially next to the differential on the drive axis of the drive device. Such a torque vectoring drive allows dynamic cornering of the motor vehicle, since the torque distribution between the output shafts can be actively influenced. For this, an additional torque is applied to the differential and/or to the output shafts via an additional drive. By the arrangement of the torque vectoring drive on the differential, the torques applied are relatively low and the torque vectoring drive may accordingly be dimensioned smaller.

Preferably, the drive device comprises a parking lock, wherein the parking lock is configured such that the planet carrier and/or the sun gear can be blocked by the parking lock, i.e. a rotation of the planet carrier and/or sun gear is prevented.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

FIG. 1 to FIG. 4 show a drive device according to the invention for a motor vehicle. The drive device comprises a drive motor 18 which drives a drive shaft 1, in particular the rotor shaft of the drive motor 18. A first gear stage of the drive device is formed on this drive shaft 1 and comprises a planetary gear mechanism 5 and a differential 2 which is integrated in the planetary gear mechanism 5.

The drive shaft 1 directly drives the sun gear 8 of the planetary gear mechanism 5. The sun gear 8 meshes with planet gears 21 which are mounted rotatably on a planet carrier 6. The planet gears 21 in turn mesh with the ring gear 14 of the planetary gear mechanism 5. The output from the first gear stage takes place via the planet carrier 6, which simultaneously forms the differential housing of the differential 2.

Differential gears 7 of the differential 2 are mounted rotatably on the planet carrier 6. The rotation axis of the differential gears 7 is positioned radially relative to the drive axis 1, and the rotation axis of the planet gears 21 is axially parallel to the drive axis 1. The differential gears 7 mesh with a left and a right side gear 9 of the differential 2, the torque from which is transmitted directly by means of a respective hollow shaft, formed coaxially to the drive axis 1, to a left output spur gear 10 and a right output spur gear 11 of the first gear stage.

The left output spur gear 10 and the right output spur gear 11 mesh with the drive spur gears 12 and 13 of the second gear stage. The left and right drive spur gears 12, 13 are rotationally fixedly connected to or formed integrally with the left and right output shafts 3 and 4.

Figure 1:
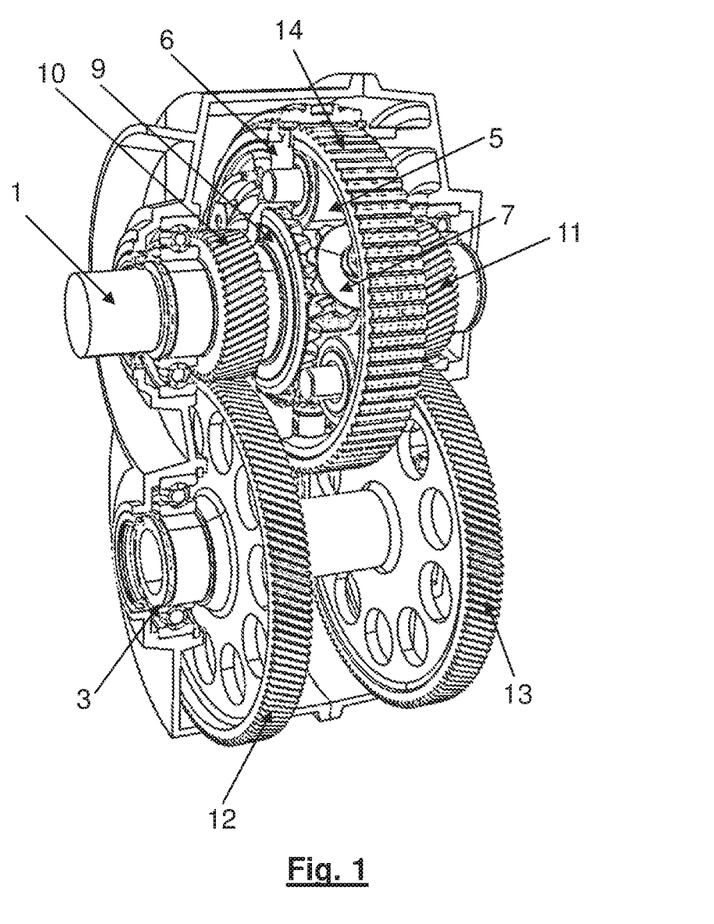
FIG. 1 is a three-dimensional, partly cut-away depiction of a drive device according to the invention.
Figure 2:
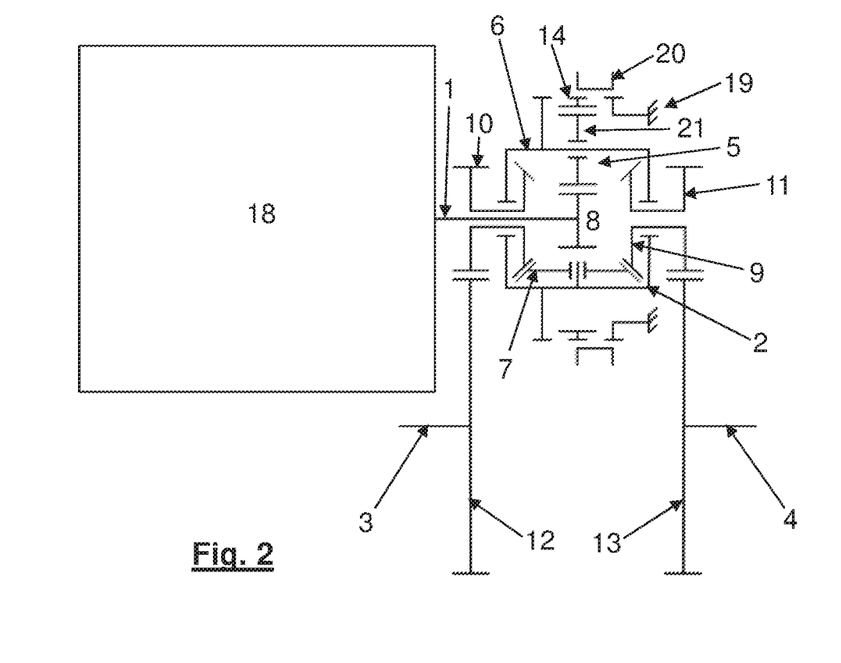
FIG. 2 is a diagrammatic view of a drive device according to the invention from FIG. 1 in a first state, namely in a first gear.
Figure 3:
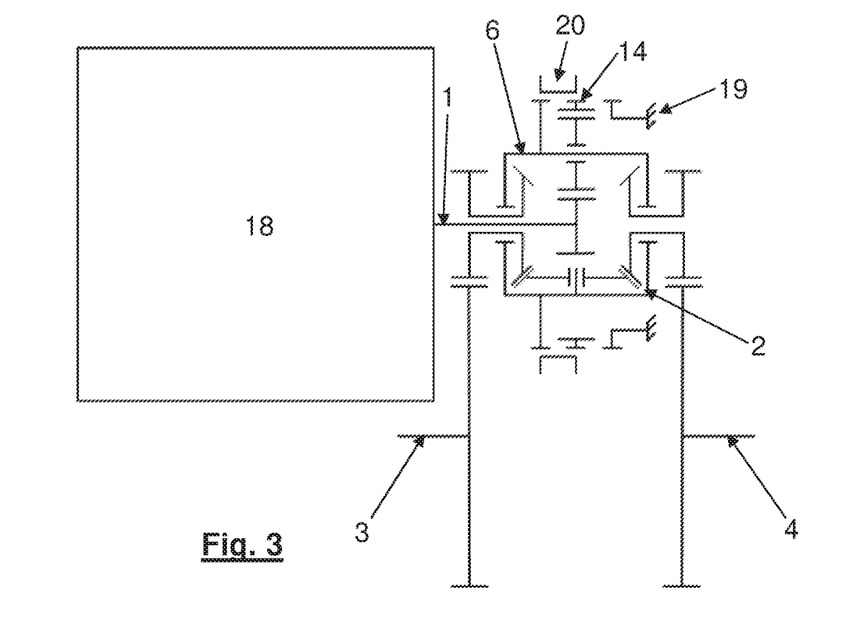
FIG. 3 is a diagrammatic view of a drive device according to the invention from FIG. 1 in a second state, namely in a second gear.
Figure 4:
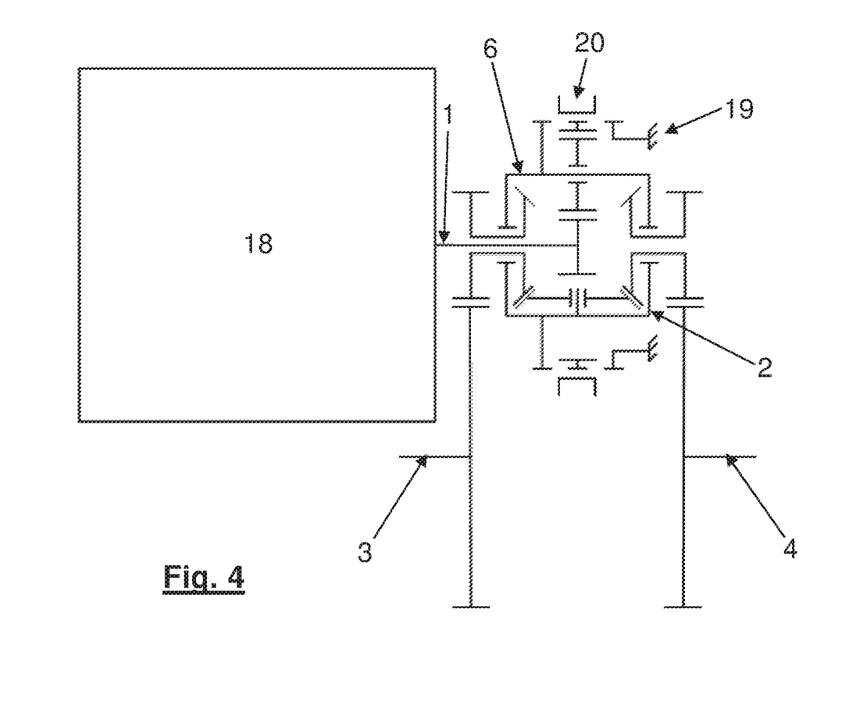
FIG. 4 is a diagrammatic view of a drive device according to the invention from FIG. 1 in a third state, namely in a neutral gear.

The translation ratio of the first gear stage may be changed by positioning the ring gear 14 in one of three different positions (FIG. 2, FIG. 3, FIG. 4). In particular, a shift collar 20 may be arranged radially outside the ring gear 14 so that by displacing the shift collar 20, a connection of the ring gear 14 can be created either to the housing 19 of the drive device (FIG. 2) or to the planet carrier 6 (FIG. 3) or to neither the housing 19 nor the planet carrier 6 (FIG. 4).

FIG. 2 shows the drive device in a first gear in which the ring gear 14 is rotationally fixedly connected to the housing 19, i.e. is stationary relative to the housing, so that the rotational speed of the ring gear 14 is set to 0. The translation ratio of the first gear stage then arises from the ratio of the number of teeth of the ring gear to that of the sun gear+1.

In FIG. 3, the ring gear 14 is connected rotationally fixedly to the planet carrier 6 and rotates as a block, the rotational speed of the ring gear 14 and planet carrier 6 is then equal to the rotational speed of the drive shaft 1.

In a middle position of the shift collar 20, as shown in FIG. 4, the ring gear 14 is connected neither fixedly to the housing nor to the planet carrier 6. A free rotation speed is therefore set at the planet carrier 6. In this position, no torque is transmitted by the drive shaft 1. This position constitutes a neutral gear of the drive device.

Figure 5:
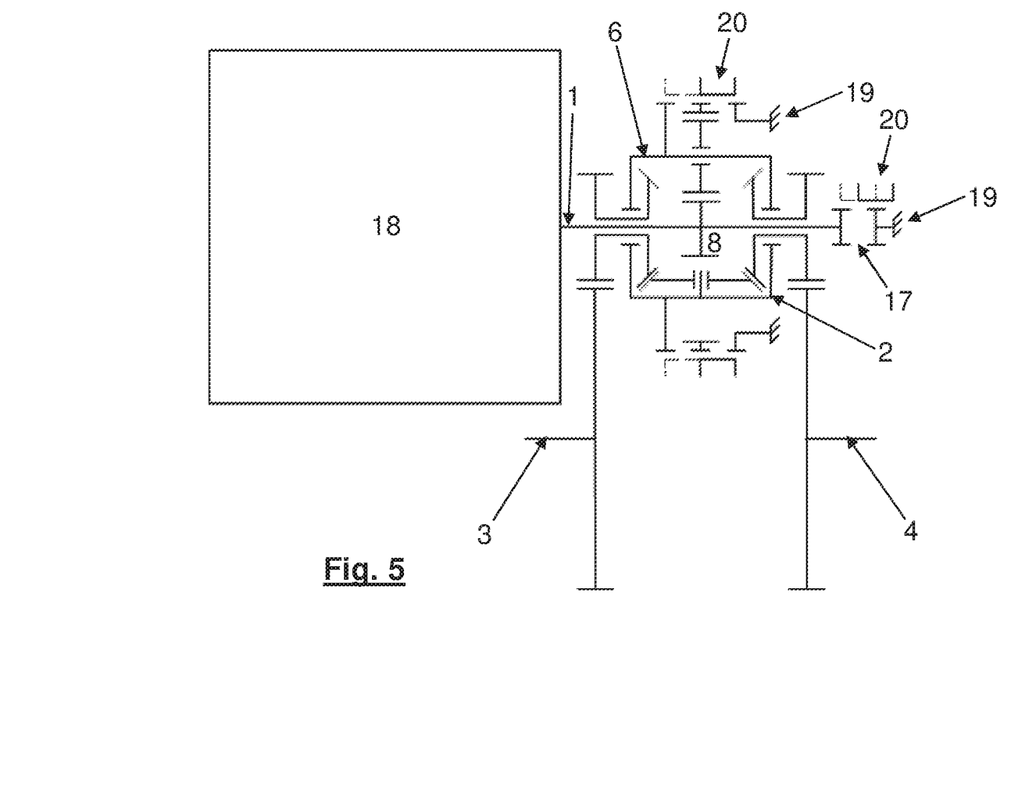
FIG. 5 is a diagrammatic view of a drive device according to the invention in an embodiment with a parking lock on the sun gear.
Figure 6:
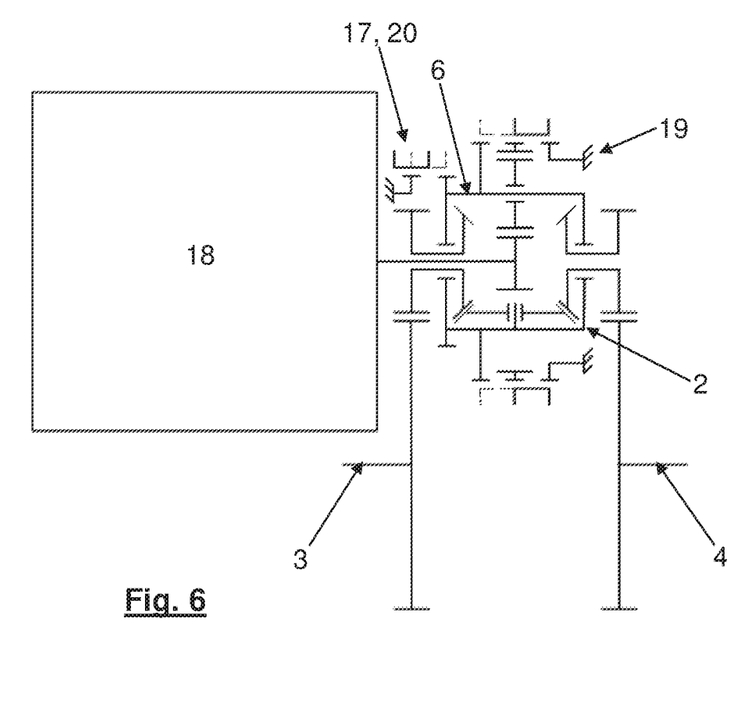
FIG. 6 is a diagrammatic view of a drive device according to the invention in an embodiment with a parking lock on the differential.

FIG. 5 and FIG. 6 show embodiments of the drive device with an additionally mounted parking lock 17.

In FIG. 5, the parking lock is arranged on the sun gear 8 or on the drive shaft 1, so that via a shift collar 20, the drive shaft 1 and the sun gear 8 can be fixedly connected to the housing and hence blocked. A possible second position for both shift collars 20 shown (on the parking lock 17 and on the ring gear) is depicted by dotted lines.

In the embodiment in FIG. 6, the parking lock 17 is formed on the differential so that the planet carrier 6, which forms the differential cage, can be fixedly connected to the housing and hence blocked.

Figure 7:
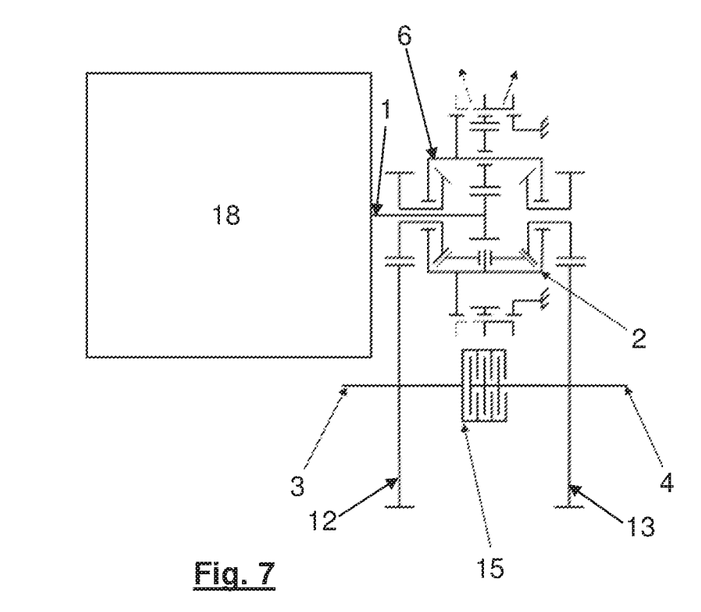
FIG. 7 is a diagrammatic view of a drive device according to the invention in an embodiment with a differential lock on the output shafts.
Figure 8:
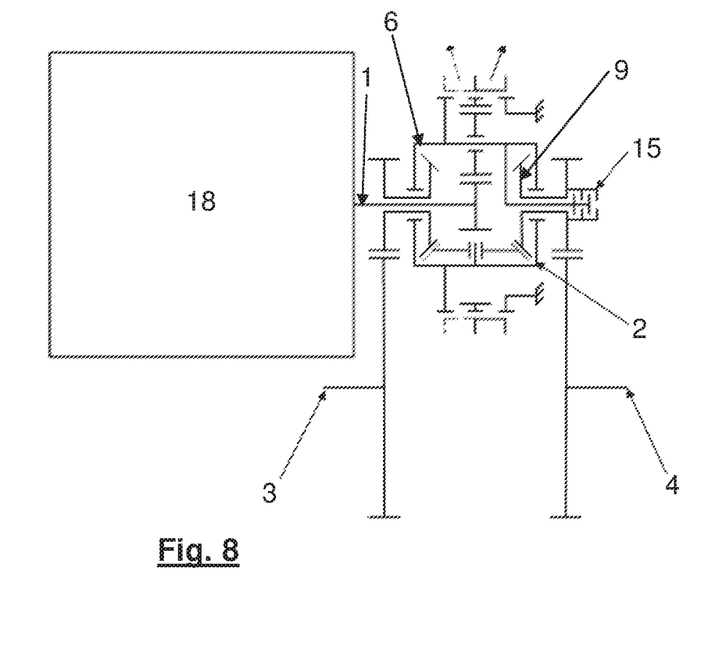
FIG. 8 is a diagrammatic view of a drive device according to the invention in an embodiment with a differential lock on the differential.

FIG. 7 and FIG. 8 show accordingly various arrangements of differential locks 15 for locking the differential 2 in drive devices according to the invention.

In FIG. 7, a differential lock 15 is formed between the left and right output shafts 3 and 4, so that the two output shafts 3, 4 can be coupled together rotationally fixedly. The differential lock 15 is here arranged space-savingly between the two drive spur gears 12 and 13 of the output shafts.

FIG. 8 shows an alternative arrangement of a differential lock 15, namely on the differential 2. Here, the planet carrier 6, i.e. the differential cage, and a side gear 9 of the differential 2, can be coupled together rotationally fixedly. The differential lock 15 is arranged axially next to the differential 2 on the drive axis of the drive device, coaxially to the drive shaft 1.

Figure 9:
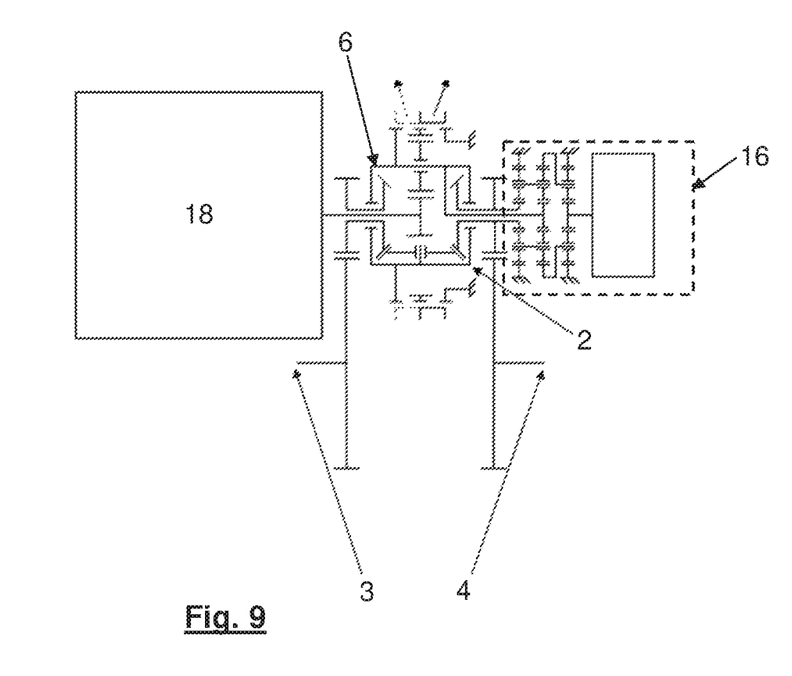
FIG. 9 is a diagrammatic view of a drive device according to the invention in an embodiment with a torque vectoring drive.

FIG. 9 finally shows a further embodiment of a drive device according to the invention, which has a torque vectoring drive 16 on the differential 2. The torque vectoring drive 16 has its own drive motor which can be coupled rotationally fixedly to the planet carrier 6 and/or an output spur gear 9, 10. The torque vectoring drive 16 is arranged axially next to the differential 2 on the drive axis of the drive device, i.e. again coaxially to the drive shaft 1.

According to the invention, naturally any combinations of the embodiments of the drive device shown are possible, for example with parking lock, differential lock and/or torque vectoring drive.

LIST OF REFERENCE DESIGNATIONS

1 Drive shaft
2 Differential
3 Left output shaft
4 Right output shaft
5 Planetary gear mechanism
6 Planet carrier
7 Differential gear
8 Sun gear
9 Side gear
10 Left output spur gear
11 Right output spur gear
12 Left drive spur gear
13 Right drive spur gear
14 Ring gear
15 Differential lock
16 Torque vectoring drive
17 Parking lock
18 Drive motor
19 Housing
20 Shift collar
21 Planet wheel

What is claimed is:

1. A drive apparatus for a motor vehicle, comprising a drive shaft, an at least two-gear manual transmission, a differential, a left-hand output shaft and a right-hand output shaft, the manual transmission being configured as a planetary transmission drive-connected to the drive shaft and having a planet carrier, the differential being integrated into the planet carrier of the planetary transmission, wherein the planetary transmission is seated together with the differential on the drive shaft and are configured to define a first transmission stage.

2. The drive apparatus according to claim 1, wherein the planet carrier of the planetary transmission forms a differential housing of the differential.

3. The drive apparatus according to claim 2, wherein the differential includes differential gears mounted for rotation within the planet carrier and left and right side gears rotatably supported within the planet carrier and which are meshed with the differential gears, and wherein the drive shaft extends through one of the side gears into the planet carrier.

4. The drive apparatus according to claim 3, wherein the planetary transmission further includes a sun gear located with the planet carrier and fixed for rotation with the drive shaft, a ring gear surrounding a portion of the planet carrier, and a plurality of planet gears rotatably supported by the planet carrier and meshed with both the sun gear and the ring gear.

5. The drive apparatus according to claim 4, wherein a left-hand output gear is located outside of the planet carrier and is fixed for rotation with the left side gear, and wherein a right-hand output gear is located outside of the planet carrier and is fixed for rotation with the right side gear.

6. The drive apparatus according to claim 5, wherein the left-hand output gear meshes with a left-hand drive gear fixed to the left-hand output shaft, and the right-hand output gear meshes with a right-hand drive gear fixed to the right-hand output shaft, the left-hand and right-hand output shafts and the left-hand and right-hand drive gears forming a second transmission stage of the drive apparatus.

7. The drive apparatus according to claim 6, wherein a differential lock is configured between the left-hand and right-hand output shafts, with the result that the left-hand and right-hand output shafts can be coupled fixedly to one another so as to rotate together by way of the differential lock, the differential lock being arranged between drive gears of the output shafts.

8. The drive apparatus according to claim 6, wherein a differential lock is configured to drive-connect the planet carrier and at least one of the side gears of the differential so as to rotate together by way of the differential lock.

9. The drive apparatus according to claim 4, further comprising an axially moveable shift collar mounted for common rotation with the ring gear of the planetary transmission, wherein the shift collar is operable in a first position to drive-connect the ring gear to a housing to establish a first gear for the manual transmission, and wherein the shift collar is operable in a second position to drive-connect the ring gear to the planet carrier for establishing a second gear for the manual transmission.

10. The drive apparatus according to claim 9, wherein the shift collar can be moved selectively into a third position, in which the ring gear is connected neither fixedly to the housing nor to the planet carrier for establishing a neutral gear of the manual transmission.

11. A drive apparatus for a motor vehicle, comprising:
a drive shaft rotatable about a center axis for being driven by a drive motor;
a planetary gear set including a sun gear rotatable with the drive shaft, a ring gear disposed about the sun gear, a plurality of planet gears meshed with the sun gear and the ring gear, and a planet carrier supporting and rotatable with the planet gears; and
a differential including at least one differential gear mounted within the planet carrier and rotatable with the planet carrier about the drive shaft, the differential further including a left side gear and a right side gear each meshed with the at least one differential gear and being rotatable about the center axis, wherein a left output spur gear receives torque from the left side gear and a right output spur gear receives torque from the right side gear,
wherein a left drive spur gear is meshed with the left output spur gear and rotationally fixed to a left output shaft, wherein a right drive spur gear is meshed with the right output spur gear and rotationally fixed to a right output shaft, and wherein a differential lock is located between the left drive spur gear and the right drive spur gear and is configured to rotatably fix the left and right output shafts to one another.

12. The drive apparatus as set forth in claim 11 wherein the differential lock is configured to rotationally couple the planet carrier and at least one of the left and right side gears of the differential to cause the planet carrier and the at least one of the side gears to rotate together.

13. The drive apparatus as set forth in claim 11, wherein the ring gear of the planetary gear set is selectively moveable between a first position and a second position, wherein the ring gear is fixed to a housing in the first position, and wherein the ring gear is rotatably fixed to the planet carrier in the second position.

14. The drive apparatus as set forth in claim 13, wherein the ring gear of the planetary gear set is further movable into a third position wherein the ring gear is connected to neither the housing or the planet carrier.

15. The drive apparatus as set forth in claim 11 wherein the planet carrier forms a differential housing of the differential.

16. A drive apparatus for a motor vehicle, comprising:
a drive shaft rotatable about a center axis for being driven by a drive motor;
a planetary gear set including a sun gear rotatable with the drive shaft, a ring gear disposed about the sun gear, a plurality of planet gears meshed with the sun gear and the ring gear, and a planet carrier supporting and rotatable with the planet gears;
a differential including at least one differential gear mounted within the planet carrier and rotatable with the planet carrier about the drive shaft, and a left side gear and a right side gear each meshed with the at least one differential gear; and
a differential lock configured to rotationally couple the planet carrier and at least one of the left and right side gears of the differential to cause the planet carrier and the at least one of the side gears to rotate together.

17. A drive apparatus for a motor vehicle, comprising:
a drive shaft rotatable about a center axis for being driven by a drive motor;
a planetary gear set including a sun gear rotatable with the drive shaft, a ring gear disposed about the sun gear, a plurality of planet gears meshed with the sun gear and the ring gear, and a planet carrier supporting and rotatable with the planet gears; and
a differential including at least one differential gear mounted within the planet carrier and rotatable with the planet carrier about the drive shaft,
wherein the ring gear of the planetary gear set is selectively moveable between a first position and a second position, wherein the ring gear is fixed to a housing in the first position, and wherein the ring gear is rotatably fixed to the planet carrier in the second position.

18. The drive apparatus as set forth in claim 17, wherein the ring gear of the planetary gear set is further moveable to a third position wherein the ring gear is connected to neither the housing or the planet carrier.

\* \* \* \* \*